US007330635B2

United States Patent
Fujita

(10) Patent No.: US 7,330,635 B2
(45) Date of Patent: Feb. 12, 2008

(54) STORAGE-TYPE BROADCAST SERVICE SYSTEM AND RECEPTION STORAGE UNIT

(75) Inventor: Kenichi Fujita, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 1118 days.

(21) Appl. No.: 10/049,479

(22) PCT Filed: Jun. 11, 2001

(86) PCT No.: PCT/JP01/04909

§ 371 (c)(1),
(2), (4) Date: Feb. 12, 2002

(87) PCT Pub. No.: WO01/97515

PCT Pub. Date: Dec. 20, 2001

(65) Prior Publication Data

US 2003/0185540 A1 Oct. 2, 2003

(30) Foreign Application Priority Data

Jun. 13, 2000 (JP) ............... P.2000-177631
Apr. 25, 2001 (JP) ............... P.2001-128502

(51) Int. Cl.
  *H04N 7/16* (2006.01)
  *H04N 5/91* (2006.01)
(52) U.S. Cl. ............... 386/46; 725/135; 725/143
(58) Field of Classification Search ............... 386/1, 386/46, 83, 55, 57, 84; 725/35, 46–49, 52, 725/54, 58, 143–153, 74
See application file for complete search history.

(56) References Cited

U.S. PATENT DOCUMENTS

| 5,790,176 A | * | 8/1998 | Craig ............... 725/115 |
| 5,896,557 A | * | 4/1999 | Suzuki et al. ............... 725/139 |
| 6,463,155 B1 | * | 10/2002 | Akiyama et al. ............... 380/278 |
| 6,601,237 B1 | * | 7/2003 | Ten Kate et al. ............... 725/47 |

(Continued)

FOREIGN PATENT DOCUMENTS

CN 1055095 A 10/1991

(Continued)

OTHER PUBLICATIONS

Corresponding Korean Patent Application.

*Primary Examiner*—Thai Q. Tran
*Assistant Examiner*—Mishawn Dunn
(74) *Attorney, Agent, or Firm*—Pearne & Gordon LLP

(57) ABSTRACT

The object of the invention is to assure storage of data in information delivery services using storage media and providing services that promises the viewer's convenience.

Receiving/storage apparatus (11) according to the invention holds exclusive storage regions in one or more physical or logical units to allocate to storage channels. The receiving/storage apparatus (11) comprises a storage channel management section (101) for managing storage channels, a reservation processing section (102) for making reservation for receiving information on storage channels, a receiver (103) for receiving information, a storage management section (104) for managing the received information and holding the relationship between reference names and storage names, and a storage channel operation application section (105) for implementing features necessary for the store and forward broadcast service based on the information managed in said storage channel management section (101).

20 Claims, 11 Drawing Sheets

U.S. PATENT DOCUMENTS

| | | | |
|---|---|---|---|
| 6,862,657 B1 * | 3/2005 | Grimsrud et al. | 711/112 |
| 6,928,423 B1 * | 8/2005 | Yamanaka | 705/50 |
| 7,228,413 B1 * | 6/2007 | Suzuki | 713/162 |
| 2003/0031459 A1 * | 2/2003 | Nishi et al. | 386/46 |
| 2005/0132295 A1 * | 6/2005 | Noll et al. | 715/744 |

FOREIGN PATENT DOCUMENTS

| | | |
|---|---|---|
| JP | 4-506276 A | 10/1992 |
| JP | 9-65288 A | 3/1997 |
| JP | 11-112494 A | 4/1999 |
| JP | 11-232727 | 8/1999 |
| WO | 91/13695 | 9/1991 |

* cited by examiner

FIG. 3

| REGION IDENTITY | REGION SIZE | INSTALLED STORAGE CHANNEL |
|---|---|---|
| D : | 2GB | – |
| E : | 2GB | – |
| F : | 2GB | – |
| G : | 2GB | – |
| H : | 2GB | – |
| I : | 2GB | – |
| J : | 2GB | – |
| K : | 2GB | – |
| L : | 2GB | – |
| M : | 2GB | – |

FIG. 4

| CHANNEL NUMBER | 1000 | 10001 | 1002 | ...... |
|---|---|---|---|---|
| CHANNEL NAME | CHANNEL 1000 | CHANNEL 1001 | CHANNEL XX | ...... |
| CHANNEL IDENTITY | AAA | BBB | CCC | ...... |
| STORAGE REGION INFORMATION | * 2GB /aaa 2GB | * 2GB | * 2GB /ddd 2GB | ...... |
| DOWNLOAD INFORMATION | — | DownloadId = 1 | — | ...... |
| CONTRACT INFORMATION | — | FEE 500/MONTH | — | ...... |
| ENCRYPTION INFORMATION | — | PublicKey **** | — | ...... |
| ENTRY INFORMATION | Engine * StartUp *.* | Engine * StartUp *.* | Engine * StartUp *.*** | ...... |

FIG. 5

| STORAGE CHANNEL IDENTITY | SUBSCRIPTION STATE | CONTRACT CHECK | ENCRYPTION KEY | ENTRY OPERATION |
|---|---|---|---|---|
| AAA | SUBSCRIPTION | UNNECESSARY | ** | Engine  StartUp *.*** |

FIG. 6

| CHANNEL NUMBER | CHANNEL NAME | | | CHANNEL STATE | |
|---|---|---|---|---|---|
| 1000 | CHANNEL 1000 | FREE | UNINSTALLED | NOT SUBSCRIBED | 4GB |
| 1001 | CHANNEL 1001 | FREE | UNINSTALLED | NOT SUBSCRIBED | 2GB |
| 1002 | CHANNEL XX | FREE | UNINSTALLED | NOT SUBSCRIBED | 4GB |

( SELECT A CHANNEL )   ( INSTALL )   ( SUBSCRIBE )

FIG. 7

STARTING INSTALLATION OF THE FOLLOWING STORAGE CHANNEL.

CHANNEL NAME: "STORAGE CHANNEL 1000"
CHANNEL NUMBER: 1000
CAPACITY NECESSARY FOR INSTALLATION: 4GB
CONTRACT INFORMATION: FREE CHANNEL ( START INSTALLATION )   ( CANCEL )

| STORAGE CHANNEL IDENTITY | EXCLUSIVE STORAGE REGION |
|---|---|
| /preston/AAA | D: |
| /preston/AAA/aaa | E: |

| TRANSMIT FILE NAME (REFERENCE NAME) | STORAGE REGION | STORAGE FILE NAME |
|---|---|---|
| file: //AAA/abc.bin | D: | /preston/AAA/abc.bin |
| file: //AAA/aaa/def.bin | E: | /preston/AAA/aaa/def.bin |
| file: //AAA/bbb/ghi.bin | D: | /preston/AAA/bbb/ghi.bin |

FIG. 13

| CHANNEL IDENTITY | SIZE OF REGION IN USE |
|---|---|
| AAA | 1.2G |
| BBB | 2.1G |
| CCC | 0.5G |
| DDD | 1.3G |
| EEE | 0G |
| FFF | 2.5G |

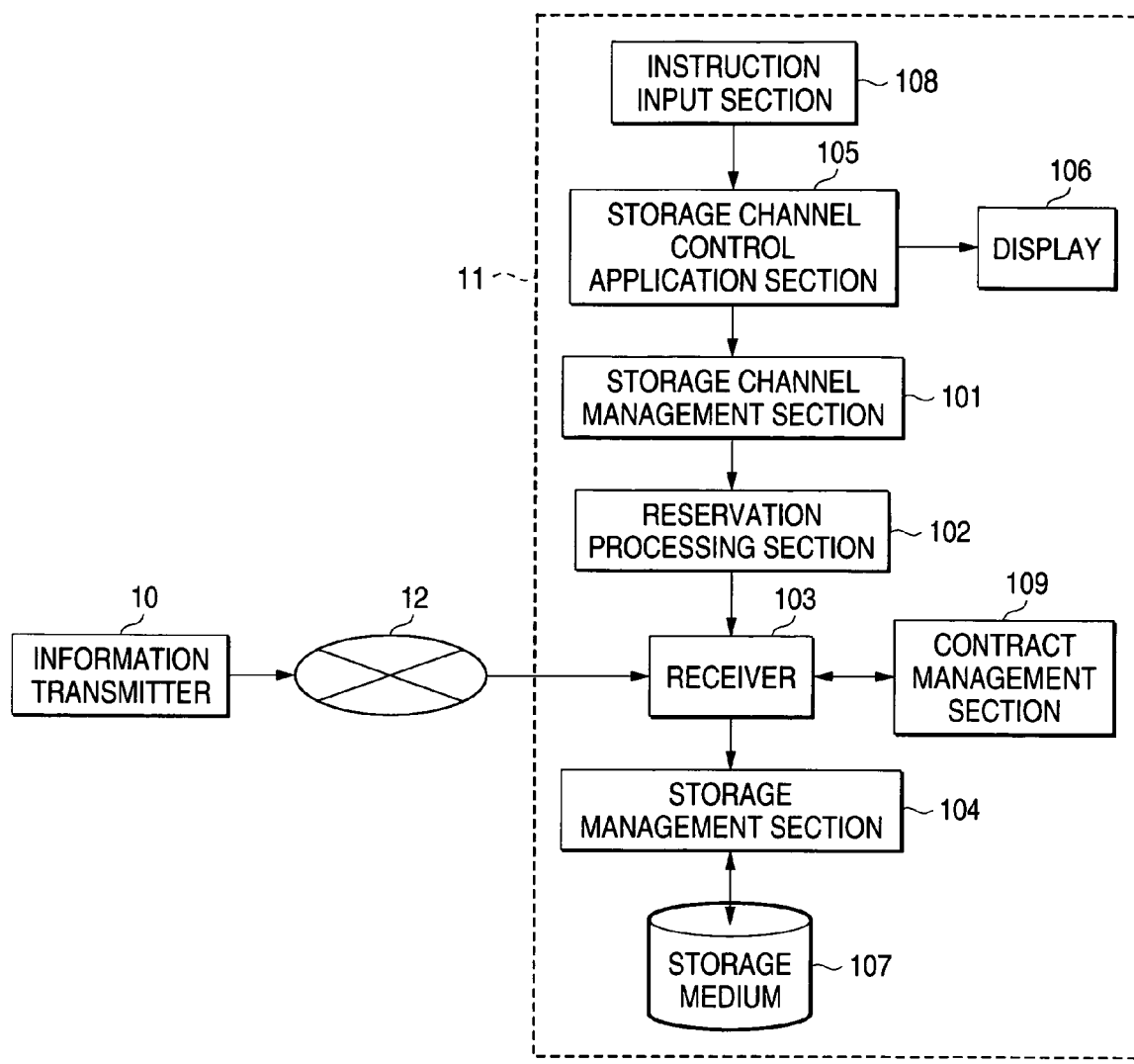

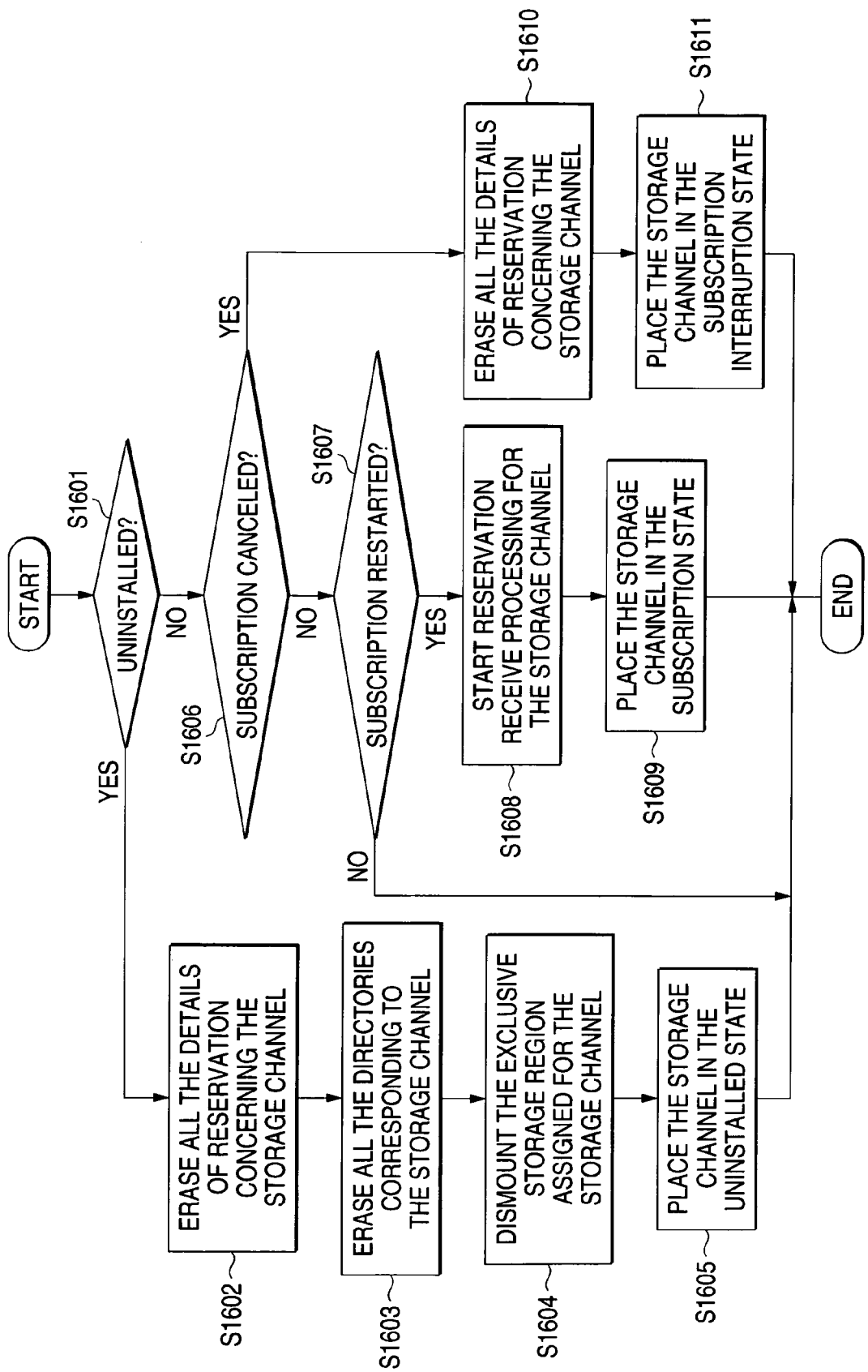

STORAGE-TYPE BROADCAST SERVICE SYSTEM AND RECEPTION STORAGE UNIT

TECHNICAL FIELD

The present invention relates to an information delivery service and receiving/storage apparatus preferable for use in digital broadcasts and in particular to a broadcast system for performing a preferable service by using receiving/storage apparatus having high-capacity storage media.

BACKGROUND OF THE INVENTION

With the progress in the digital broadcast technologies, efficient use of bandwidths in the limited frequency resources has become possible, thus allowing a variety of services such as data broadcasts. The data broadcast service, unlike related art services using pictures and voice alone, uses multimedia information such as still pictures and text. The data broadcast service which is easy to create and interactive, is expected to play the central role in the future digital broadcasts. Services have been launched that provide information including weather forecasts and news over data broadcasts. Viewers access such services with different timings so that the same data is typically transmitted repeatedly over a long period.

Meanwhile, digital storage media are getting denser and lower-cost, and services that temporarily store broadcasts on storage media before using the broadcasts have been on the market. Features that constantly buffer TV programs under broadcasting and regenerates the programs as required are already in practical use as well as the ordinary program recording feature. New services such as highlight viewing of recorded programs are under study.

In this way, by using recorded media effectively, it is possible to solve the problem with the efficient use of transmission bandwidth by way of repeated transmission as in the related art data broadcasts. That is, data is stored on storage media in advance and the viewer can use the data stored on the storage media as necessary. This method allows uses of a large content that cannot be transmitted at a time thus upgrading the service quality.

However, operation of the services of such a form involves the following problems:

1) Data cannot be stored depending on the use conditions of the storage media. While the capacity of storage media in receiving/storage apparatus is limited, services that use the storage media are varied. Storage capacity necessary for receiving a service cannot be reserved depending on the service usage of the viewer.
2) Storage of data on a per small content basis results in cumbersome management on the viewer's side. In case arrangement is made so that necessary content is selected as required then received/stored, selection of contents and management/adjustment of received contents involves considerable operation procedures.
3) Information recorded on storage media must be specified on the sending party.

Services of such form, unlike ordinary recording of programs based on the viewer's instruction, must store only the information specified by the sending party.

The invention, in view of the aforementioned problems, aims at assuring storage of data in information delivery services using storage media and providing services that promises the viewer's convenience.

DISCLOSURE OF THE INVENTION

In order to solve the problems, the invention embodies a store and forward broadcast service using the "storage channel" as the core of its principle. The storage channel is defined as a virtual channel that is based on the information delivery to exclusively reserved storage regions. In other words, it is a model where an information source declares the necessary storage capacity before using its service, reserves the declared storage capacity in receiving/storage apparatus and delivers the information it provides to the reserved storage regions. The store and forward broadcast service is based on storage channels and provides installation of storage channels and selection of channels.

In order to implement the store and forward broadcast service, the receiving/storage apparatus according to the invention holds exclusive storage regions in one or more physical or logical units to allocate to storage channels.

The receiving/storage apparatus of the invention comprises a storage channel management section for managing storage channels, a reservation processing section for making reservation for receiving information on storage channels, a receiver for receiving information, a storage management section for managing the received information and holding the relationship between reference names and storage names, and a storage channel operation application section for implementing features necessary for the store and forward broadcast service based on the information managed in said storage channel management section.

The invention, with the aforementioned configuration, assures storage of data in the information delivery service using storage media as well as provides services that meet the viewer's convenience.

BRIEF DESCRIPTION OF THE DRAWINGS

FIG. 3 lists the exclusive storage region management information in the storage channel management section in the embodiment of the invention.

FIG. 4 lists an exemplary content of storage channel list information in the embodiment of the invention.

FIG. 5 lists an exemplary content of a storage channel management table in the embodiment of the invention.

FIG. 6 shows a storage channel list screen in the embodiment of the invention.

FIG. 7 shows a storage channel installation screen in the embodiment of the invention.

FIG. 13 shows an example of an capacity table of the exclusive storage regions that the capacity management section holds inside in the embodiment of the invention.

FIG. 14 shows a general configuration of the store and forward broadcast system including a contract management section in the embodiment of the invention.

FIG. 15 shows an example of delivery schedule information in the embodiment of the invention.

FIG. 16 is a flowchart showing the operation of uninstallation, cancellation of subscription, and restart of subscription.

In the figures, a numeral 10 represents an information transmitter, 11 receiving/storage apparatus, 12 a broadcast network, 101 a storage channel management section, 102 a reservation processing section, 103 a receiver, 104 a storage management section, 105 a storage channel control application section, 106 a display, 107 a storage medium, 108 an instruction input section, and 109 a contract management section.

BEST MODE FOR CARRYING OUT THE INVENTION

Figure 1:
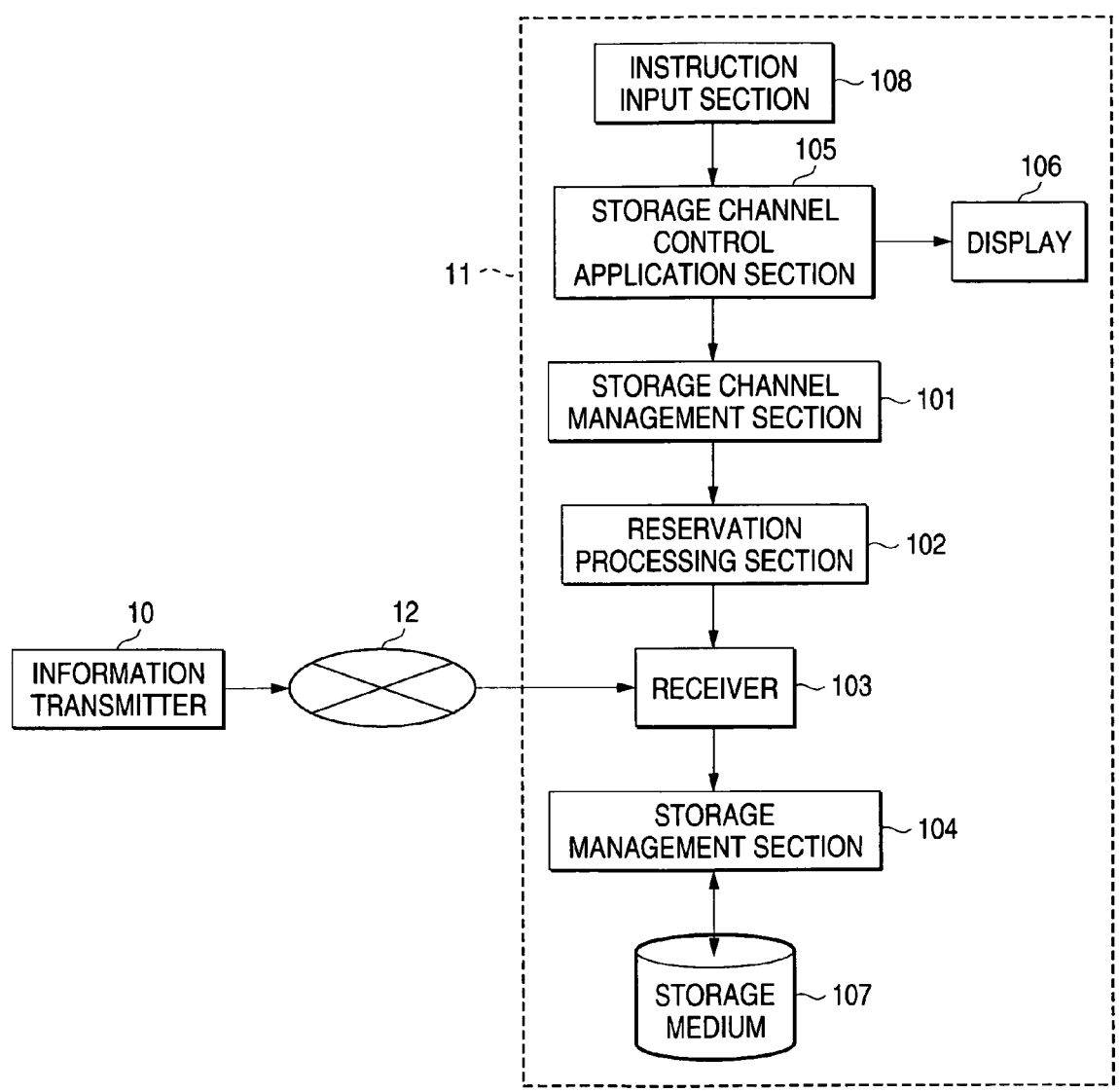
FIG. 1 is a block diagram showing the general configuration of a store and forward broadcast service system in an embodiment of the invention.

An embodiment of a store and forward broadcast service system and receiving/storage apparatus in the invention will be described referring to figures. FIG. 1 is a block diagram showing the general configuration of a store and forward broadcast service system in an embodiment of the invention. In FIG. 1, a numeral 10 represents an information transmitter for transmitting information such as broadcast services in the form of broadcasts, 11 receiving/storage apparatus for receiving and storing information such as broadcast services transmitted from the information transmitter 11. The information transmitter 10 and the receiving/storage apparatus 11 are interconnected via a broadcast network 12. The receiving/storage apparatus 11 can incorporate a feature for receiving ordinary broadcast services via the broadcast network 12. In the receiving/storage apparatus 11 storage channels are installed. The receiving/storage apparatus 11 comprises a storage channel management section 101, a reservation processing section 102 connected to the storage channel management section 101, a receiver 103 for receiving information in accordance with the details of reservation in the reservation processing section 102, a storage management section 104 for storing the received information, a storage channel operation application section 105 for causing storage channel programs to be executed, a display 106 for displaying information based on the operation of the storage channel operation application section 105, a storage medium 107 for storing the received information, and an instruction input section 108 for inputting various instructions to the storage channel operation application section 105.

In the receiving/storage apparatus 11, the storage channel management section 101 manages the storage channels installed on the receiving/storage apparatus 11. The reservation processing section 102 performs reservation operation for receiving the information on storage channels. The receiver 103 receives various information transmitted from the information transmitter. The storage management section 104 stores the information received by the receiver 103 into the storage medium 107. The storage channel control application section 105 is in charge of listing the storage channels and selection of channels by using the management details in the storage channel management section 101. The display 106 displays the screen generated in the storage channel control application section 105. The storage medium 107 may be an external or working medium although the internal storage medium is used in the embodiment. Concerning the storage medium in the invention, connection form such as external connection and the number of storage devices connected are not restricted. The instruction input section 1018 receives operation instruction made by the viewer using a remote control (shown in FIG. 11).

Figure 2:
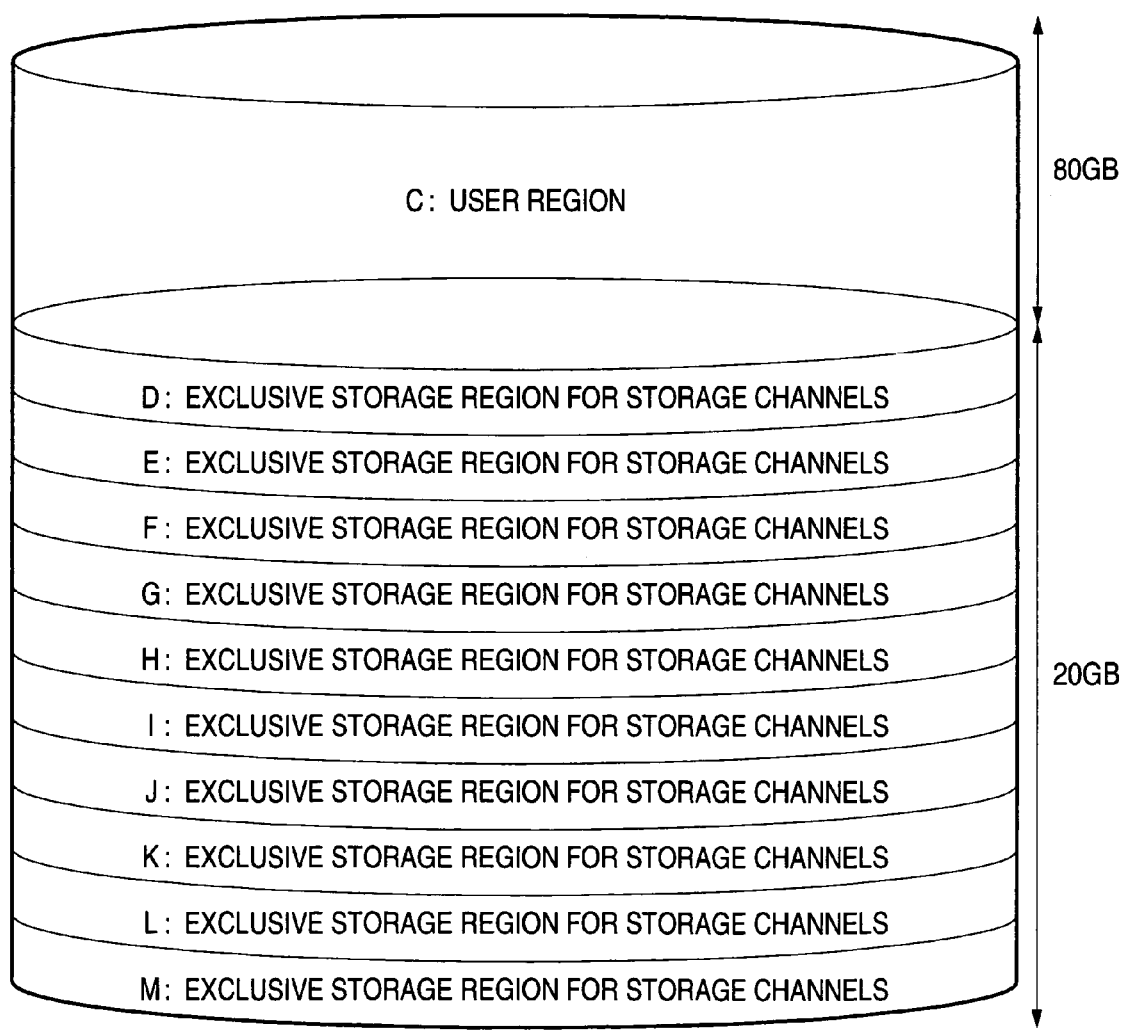
FIG. 2 is a schematic view of allocation of exclusive storage regions on the storage media in the embodiment of the invention.

FIG. 2 shows allocation of exclusive storage regions on the storage medium 107 in the receiving/storage apparatus 11. Assuming that the total storage volume of the storage medium 107 is 100 GB (Gigabytes), the storage medium 107 are split into a user region C of 80 GB and 10 exclusive regions (D through M) each consisting of 2 GB and then initialized. The user region can be used by the viewer as required such as ordinary recording of broadcast programs. On the other hand, the exclusive storage regions reaching 20 GB in total are provided in advance for use of storage channels. The storage medium 107 may be a hard disk, a DVD-RAM, an SD card, a memory card, and so on. While the number of the exclusive storage regions installed on the receiving/storage apparatus 11 is 10, the number may be any number from 1 or above. The exclusive storage regions identified by D: through M: in FIG. 2 are managed in the storage channel management section. The storage channel management section 101 manages the relationship between the installed exclusive storage regions and individual storage channels although no storage channels are installed in the initial state. The exclusive storage region management information in the storage channel management section 101 in this state is shown in FIG. 3.

An exemplary operation of installing storage channels onto the receiving/storage apparatus 11 thus initialized will be described. First, the receiving/storage apparatus 11 acquires storage channel list information provided via the broadcast network 12. The storage channel list information is received on a regular or on-demand basis and stored into a region under control by the storage channel management section 101. The storage channel list information may be acquired via satellite communications, terrestrial television broadcasting, cable TVs or internet, as well as via the broadcast network 12.

FIG. 4 shows the details of storage channel list information in this embodiment. Channel numbers are used by the viewer to select storage channels. Channel names are names assigned to storage channels for presentation to the viewer. Channel identity is a name used for uniquely identifying each storage channel on the receiving/storage apparatus 11. Each information item of storage channels has a reference name including this identification name. The storage region information pertains to exclusive storage regions necessary for installing storage channels and describes region identity and storage capacity corresponding to each exclusive storage region. In this embodiment, it is compulsory for an exclusive storage region used as a storage channels to be composed in units of 2 GB. Defining the capacity of a storage channel in units of predetermined fixed capacity is extremely effective means for simplifying the configuration of the receiving/storage apparatus 11. In case operation based on the fixed capacity is not made, the receiving/storage apparatus 11 may be provided with a capacity management section to provide the same effect. In this case, it is necessary for the capacity management section to constantly monitor the size of data written onto the storage medium 107 so that the storage channel can reserve the defined capacity of the exclusive storage regions without fail.

FIG. 13 shows an example of a capacity table in the exclusive storage region that the capacity management section holds (hereinafter referred to as the capacity table). In the capacity table, for example, channel identities and the capacities of the exclusive storage regions the channel identities are using are stored in correspondence. Each time the exclusive storage regions corresponding to a channel identity changes, the table is updated. The capacity management section determines whether download of a new content or storage channel is possible based on the information in the capacity table.

The capacity management section may be configured to be included for example in the storage management section 104. Features of said capacity management section may be implemented by installing a program to make a general-purpose computer to execute said features. With such a configuration, it is possible for the capacity of the exclusive storage region on the receiving/storage apparatus 11 to take an arbitrary value. This embodiment can mount a plurality of fixed capacities depending on the scale of the service. In this case, the exclusive storage region to be reserved is extracted based on the capacity described in the storage region information.

In FIG. 4, the download information is information for receiving software necessary for using a storage channel. Here, download location information necessary for receiving a download content is separately transmitted assuming operation that is identifiable using the downloadId. By including download information as information used in installation of a storage channel, extension of features specific to the storage channel is made possible and download operation is assured. Contract information describes information necessary for using a storage channel such as billing information. In this embodiment, only the rate information is described and information for implementing a contract and transmission/reception of a contract key given to a subscriber is separately operated. Of course it is possible, in another embodiment, to include said information in the contract information. Encryption information is described in case information on the storage channel is encrypted before it is transmitted. It is possible to receive a key for decoding the encryption based on the encryption information. In this embodiment, a decoding key is described in the encryption information. Entry information is described concerning the processing to be executed when a storage channel is selected. In this embodiment, an engine name to be executed and a file name to be given to the engine are described.

The storage channel management section 101 holds a storage channel management table in order to manage the state of storage channel installation, state of subscription to storage channels, and so on. Installation of a storage channel refers to initialization necessary for receiving storage channel information including reservation of exclusive storage regions. Subscription to storage channels refers to reception of information on the installed storage channels. FIG. 5 shows an example of details of the storage channel management table in this embodiment. Here, the subscription state, necessity of contract check, encryption key and entry operation are managed as a single unit for the installed storage channels. Such information can be acquired from the storage channel list information in installation.

Figures 9, 10, 11:
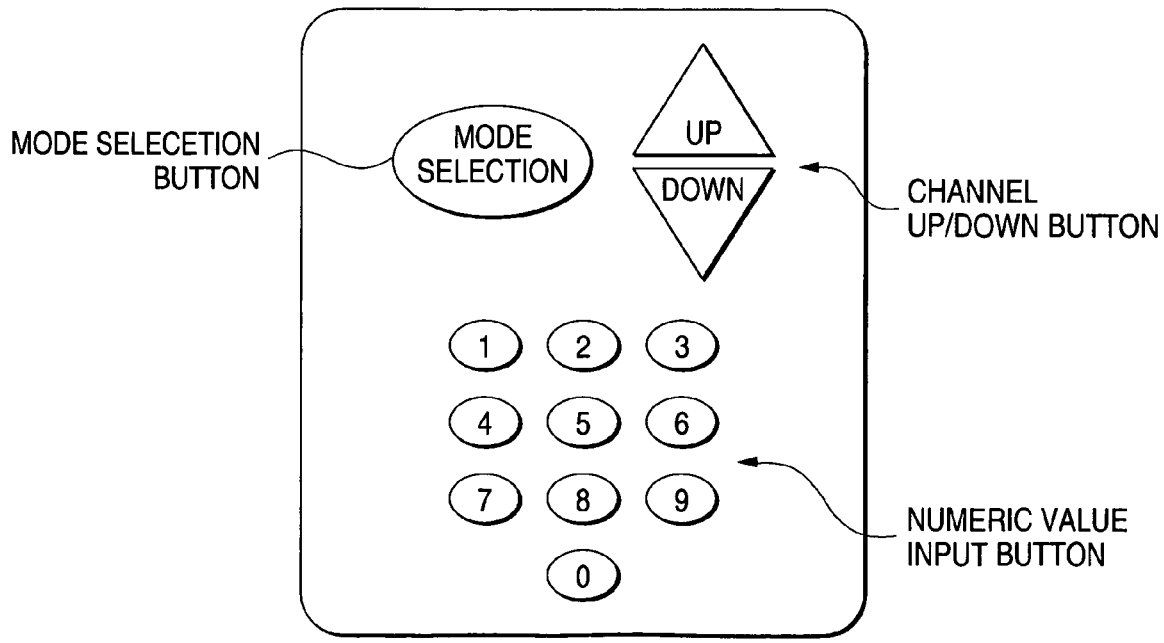
FIG. 9 lists an example of directory configuration in the receiving/storage apparatus in the embodiment of the invention.
FIG. 10 lists an example of file name conversion in the storage management section in the embodiment of the invention. in the embodiment of the invention.
FIG. 11 is a front view of a remote control used in an access to the storage channel in the embodiment of the invention.

The receiving/storage apparatus 11 can use the storage channel list information and the storage channel management table to display the storage channel list screen. When a storage channel list display instruction made by the viewer using an input device such as a remote control shown in FIG. 11 is received by the instruction input section 108, the input is transmitted to the storage channel control application section 105. In the storage channel control application section 105, the storage channel list screen is generated based on the storage channel list information and the storage channel management table managed in the storage channel management section 101 and displays the screen on the display 106. FIG. 6 is an example of the storage channel list screen. On the screen are displayed the storage channel names, channel numbers, whether installed or not, whether subscribed to or not, contract information (paid/free), capacity of the necessary exclusive storage region, and so on.

Selecting a storage channel on the storage channel list screen shown in FIG. 6 generates the installation screen in the storage channel control application section 105 and displays the screen on the display 106, in the case of an uninstalled storage channel. In the installation screen is displayed information necessary for installing a storage channel. FIG. 7 is an example of the storage channel installation screen. This screen, same as the storage channel list screen, is created in the storage channel control application section 105 using the storage channel list information managed in the storage channel management section 101.

Figure 8:
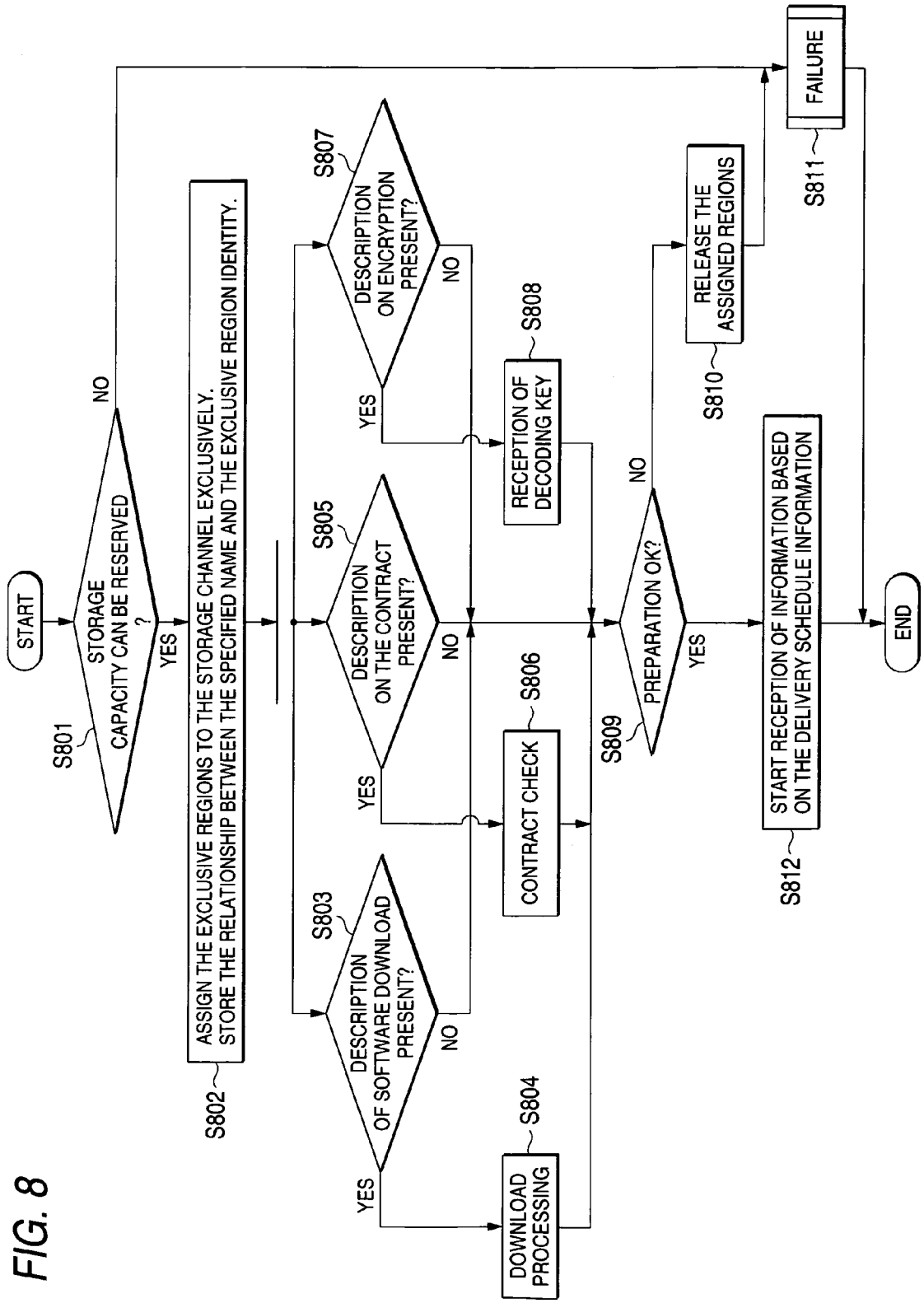
FIG. 8 is a flowchart showing the operation of storage channel installation in the embodiment of the invention.

FIG. 8 is a flowchart showing the installation operation. Installation of a storage channel is processed in accordance with service configuration information describing information necessary for installation of each storage channel, starting with reservation of exclusive storage regions (S801). The number of exclusive regions to be reserved is determined from the storage capacity information in the service configuration information and it is confirmed that the currently unused exclusive regions can be reserved. In this embodiment, service configuration information is transmitted from the information transmitter as storage channel list information. The service configuration information is described assuming that processing has been made based on the description in the storage channel list information in FIG. 4. Description in the column corresponding to each storage channel in the storage channel list information in FIG. 4 may serve as service configuration information. In the case of installing the storage channel whose cannel name is Channel 1000 among the storage channels defined in the storage channel list information in FIG. 4, two exclusive storage regions each having the capacity of 2 GB must be reserved based on the storage region information in FIG. 4. The exclusive storage region management information (FIG. 3) managed in the storage channel management section 101 is searched through for a free region. Currently, all the exclusive storage regions are available; in the example, two exclusive storage regions, D: and E:, are reserved for Channel 1000. The directory for the storage channel is created and each exclusive storage region is mounted created and each exclusive storage region is mounted using the directory name indicated (all the files under the directory are stored in the exclusive storage region). Directory configuration inn this state is shown in FIG. 9. In this embodiment, the storage channel is created under the directory/preston. This directory is determined on a per receiving/storage apparatus basis and can be arbitrarily set.

In case download location information is present in the service configuration information, necessary software is downloaded or reserved for download in accordance with the instruction (S803, S804). Concerning the software, any details, transmission method and reception method are accepted. In case contract information is present in the service configuration information, contract check processing is made (S805, S806). A contract key is separately transmitted and managed in the contract management section 109 shown in FIG. 14, then updated on a routine basis and each time the contract state changes. Any details of contract and execution method are accepted. In case encryption information is present in the storage channel information, the decoding key reception processing is made (S807, S808). Any encryption system and key reception method are accepted. Installation is complete when the aforementioned processing is complete including reception of downloaded software and decoding key. After the storage channel is registered with the storage channel management table, reception of information transmitted as a storage channel is started (this embodiment assumes automatic subscription at the end of installation). In these processes, respective information may be transmitted separately or on an asynchronous manner. Operation of the storage channel installation shown in FIG. 8 can be implemented by installing a program to make a general-purpose computer to execute the steps 802 through 812.

FIG. 16 is a flowchart of operation performed by the reservation processing section 102 for uninstallation, cancellation of subscription, and restart of subscription.

Uninstallation operation comprises the steps:

1) All the details of reservation concerning the storage channel in the reservation processing section 102 are erased (S1602).

2) All the directories corresponding to the storage channel are erased (S1603).

3) The exclusive storage region assigned for the storage channel is dismounted (S1604).

4) The storage channel is placed in the uninstalled state (S1605).

Cancellation of subscription to an installed storage channel comprises the steps:

1) All the details of reservation concerning the storage channel in the reservation processing section 102 are erased (S1610).

2) The storage channel is placed in the subscription interruption state (S1611).

Restart of subscription comprises the steps:

1) Reservation receive processing for the storage channel is started in the reservation processing section 102 (S1608).

2) The storage channel is placed in the subscription state (S1609).

Thus, transmitting storage channel information as storage channel list information and managing the state of the storage channels in the storage channel management section 101 as well as managing in association the exclusive storage regions and storage channels incorporated into the receiving/storage apparatus 11, it is possible to incorporate a storage channel desired by the viewer with a required timing. The viewer need not be conscious of individual files on a storage channel and has only to manage installation of and subscription to storage channels, which is very convenient. The aforementioned features of uninstallation, cancellation of subscription and restart of subscription can be implemented by installing a program to make a general-purpose computer to execute the flowchart in FIG. 16.

Next, transmission/reception of information, storage management and information usage of storage channels will be described. Information reception processing of storage channels is made based on the delivery schedule information. The delivery schedule information is generated on a per storage channel basis in the information delivery apparatus 10, transmitted in the storage channel list information or service configuration information, and managed under the control of the storage channel management section 101. The reservation processing section 102 manages activation of the receiver 103 that receives information, based on the delivery schedule information managed in the storage channel management section 101. FIG. 15 is an example of delivery schedule information where the transmission channel number, transmission start time and transmission end time are provided. The reservation processing section 102 sets a timer for example in the reservation processing section 102 based on the information, registers the data reception schedule with said timer (sets the transmission start time in this case), drives the timer to tune the system to the transmission channel at the transmission start time, then activates the receiver 103. In transmitting information of a storage channel, the reservation processing section 102 packet-multiplexes a plurality of arbitrary files from among the information files constituting the storage channel before transmitting the files. In the files delivery information indicating the schedule of future information transmission may be included.

The receiver 103 decodes the transmit packets and extracts the files onto the receiving buffer in the receiver 103. In this practice, these files may be encrypted and transmitted. In case a decoding key is received in installation, the key is used to decode the encryption. Each file has a name given when it was generated. The storage management section 104 determines the region to be stored based on the given name and stores the region onto the storage medium 107. The file name given during transmission is also used as a reference name in the reference from individual information items.

FIG. 10 shows an example of conversion of file names given before transmission to file names managed on the receiving/storage apparatus processed in the storage management section 104. In this example, for transmission, the character string "file://" is followed by the storage channel identity (AAA) and the subsequent file path name. In the receiving/storage apparatus 11, all the storage channels are generated in the directories under /preston. When the storage channel 1000 is installed, the directory /preston/AAA and the directory /preston/AAA/aaa are generated. Thus, by replacing the head character string "file: //" of the file name (reference name) given before transmission with "/preston/", it is possible to extract a file name to be given before storage. The directory /preston/AAA and the directory /preston/AAA/aaa are mounted in the exclusive storage region D: and exclusive storage region E: respectively. Therefore, the file HYPERLINK file://AAA/abc.bin file://AAA/abc.bin is stored in the exclusive storage region D: by the file name/ preston/AAA/abc.bin and the file HYPERLINK file://AAA/ aaa/def.bin file://AAA/aaa/def.bin is stored in the exclusive storage region E: by the file name /preston/AAA/aaa/def.bin, respectively. Conversion of transmit file names (reference names) to storage file names in the storage management section 104 is also used in such cases as another file is referenced in a file.

The reservation processing section 102 executes reservation for reception for the subsequent round, based on the newly received delivery schedule information and so on. Various information transmitted as storage channels are automatically stored into storage apparatus and updated without the viewer being conscious of the process. Thus the viewer can always use the latest information once he/she has installed storage channels.

Next, the case where ac access is made to a storage channel and information is presented in the receiving/storage apparatus set in this way will be described. FIG. 11 shows an example of a remote control used for access to a storage channel. During ordinary use, a press on the channel Up/Down button 1101 or numeric value input button 1102 switches over broadcast services for viewing. In accessing a storage channel, the viewer holds down the mode selection button 1103 and set the mode to "storage channel." The mode selection button 1103 may be shared with a button for switching over broadcast types such as television broadcasts and radio broadcasts, or a button for switching over a plurality of broadcast networks. It is possible to do away with the mode selection button 1103 and present storage channels as a sequence following the ordinary broadcast service.

By operating the channel Up/Down button 1101 or numeric value input button 1102 in the storage channel selection mode, it is possible to select a storage channel. The channel Up/Down button 1101 is used to present a storage channel with next larger/next smaller channel number. The numeric value input button 1102 is used to directly specify and present a storage channel number. The viewer's operation on the remote control is transmitted to the storage channel control application section 105 via the instruction input section 108. The storage channel control application section 105 can extract a storage channel to be selected, based on the storage channel list information managed in the storage channel management section 101. In this practice, it is also possible to reference the installation state and subscription state on the storage channels described in the storage channel management table similarly managed in the storage channel management section 101, so that it is easy to select only the storage channels installed or storage channels subscribed to. It is also easy to use said storage channel list screen to select storage channels, as well as to directly specify storage channels on the remote control.

Figure 12:
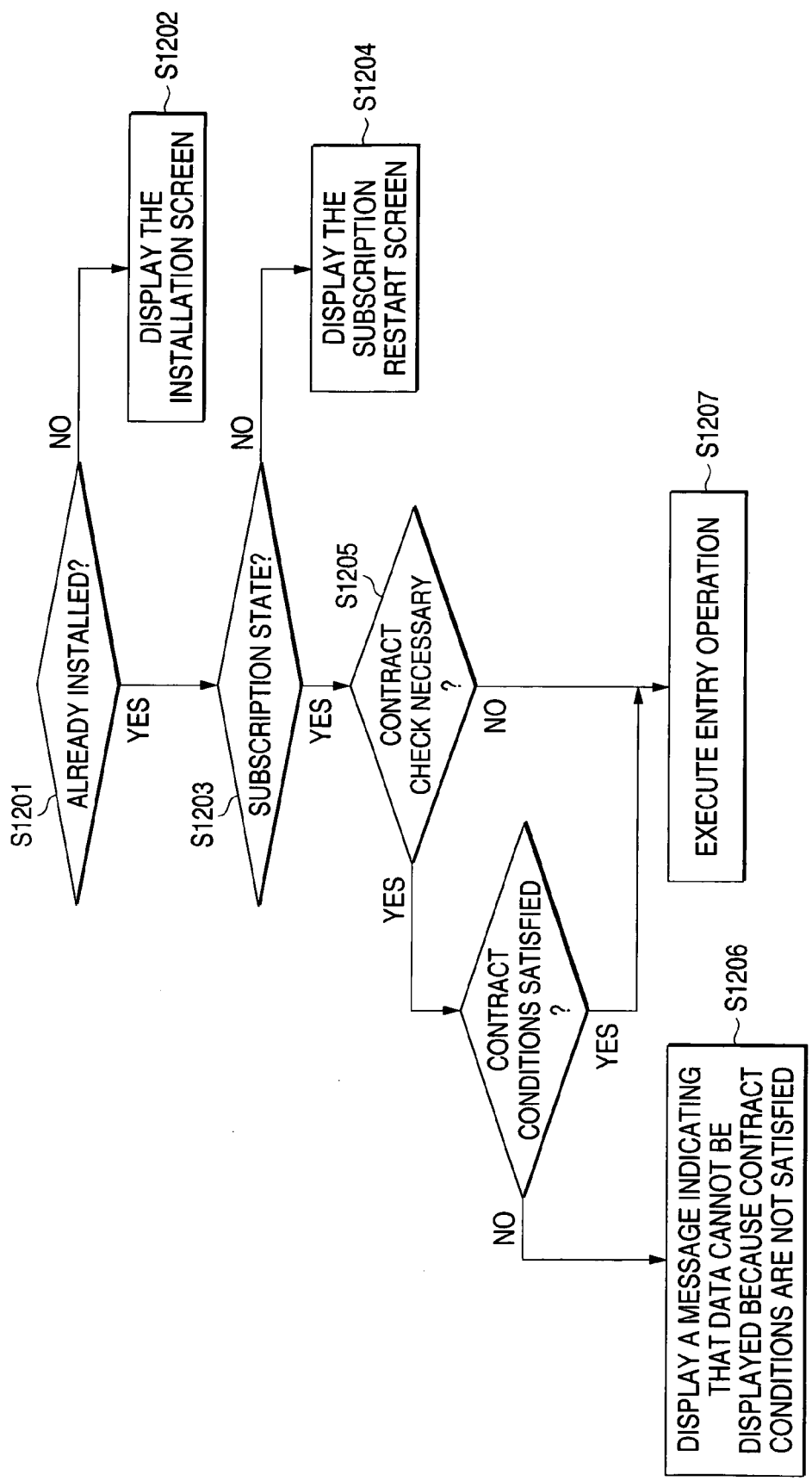
FIG. 12 is a flowchart showing the operation of storage channel selection in the embodiment of the invention.

FIG. 12 is a flowchart showing the operation of storage channel selection. When a storage channel is determined, the storage channel control application section 105 checks whether the storage channel is currently installed (S1201). This information can be acquired from the storage channel management section 101. In the case of an uninstalled storage channel, reference is made to service configuration information managed in the storage channel management section 101 to display the installation screen (S1202) The subsequent processing is the same as the foregoing description. In the case of an installed storage channel, a check is made whether the storage channel is subscribed to (S1203). In case subscription is suspended, the subscription restart screen is presented (S1204). The subsequent processing is the same as the foregoing description. In case the storage channel is subscribed to, presence/absence of the contract is checked (S1205). Validity of the contract is managed as a single unit in the contract management section 109. By passing the storage channel identity to the contract management section 109, presence/absence of validity of the contract as of the present point in time is determined (S1206). The contract management section 109 is implemented for example by an IC card. In case the validity of the contract is not satisfied at the present point in time, a message is displayed indicating that the contract is expired (S1207). In case the validity of the contract is satisfied, entry operation set per storage channel is executed (S1208). Entry operation includes specification of an engine to be activated and the corresponding initial information. Initial information is defined per execution engine. When activating an engine, the storage channel control application section 105 passes the initial information managed in the storage channel management section 101 to the engine.

Operation of the storage channel selection shown in FIG. 12 can be implemented by installing a program to make a general-purpose computer to execute the steps 1201 through 1209.

In this way, by performing the processing in the storage channel operation application section 105 in accordance with the management by the storage channel management section 101, it is possible to present information stored on the storage medium 107 as a storage channel. Access using the same user interface as that for an ordinary broadcast service is made possible thus providing such a convenience.

While selection of storage channels starts from the entry operation concerning use of information on storage channels in this embodiment, it is possible to use the reference name-to-storage name conversion in the storage management section 104 to directly specify and reference a file. For example, it is possible to implement a data broadcast feature using a file transmitted as a storage channel in an ordinary broadcast program.

In the receiving/storage apparatus according to the invention, similar features can be implemented by installing a control program to make a general-purpose computer to work as said receiving/storage apparatus.

In the information transmitter according to the invention, similar features can be implemented by installing a control program to make a general-purpose computer to work as said information transmitter.

INDUSTRIAL APPLICABILITY

As understood from the foregoing description, by using the invention, it is possible to implement a store and forward broadcast service where information recorded onto storage media has a storage channel specified by the sending party as a basic component. As a result, it is possible to store and use the intended information securely and provide a simple use method even in case the information volume is large and stored information in units of small contents has increased.

The invention claimed is:

1. A store and forward broadcast service system comprising an information transmitter for transmitting information and receiving/storage apparatus for receiving and storing information, wherein said receiving/storage apparatus manages storage regions exclusively available to a specific storage channel and information transmitted as the storage channel is stored into the exclusive storage regions in said receiving/storage apparatus, wherein the capacity of the exclusive storage regions is specified per storage channel and that the exclusive storage regions matching the storage capacity specified for the storage channel are exclusively assigned to the storage channel in said receiving/storage apparatus, wherein said information transmitter transmits service configuration information describing at least storage capacity to be reserved in said receiving/storage apparatus, software necessary for use of storage channels, contract information concerning use of storage channels, encryption information for decoding information that is encrypted and transmitted, delivery schedule information for receiving information, entry information specifying the initial operation of selection of storage channels, or information for receiving such information, and wherein said receiving/storage apparatus uses service configuration information to install storage channels.

2. A store and forward broadcast service system according to claim 1, wherein said receiving/storage apparatus mounts a plurality of exclusive storage regions of a fixed capacity in advance and defines the capacity of the storage regions to be specified per storage channel in units of said fixed capacity.

3. A store and forward broadcast service system comprising an information transmitter for transmitting information and receiving/storage apparatus for receiving and storing information,
   wherein said receiving/storage apparatus manages storage regions exclusively available to a specific storage channel and information transmitted as the storage channel is stored into the exclusive storage regions in said receiving/storage apparatus,
   wherein the capacity of the exclusive storage regions is specified per storage channel and that the exclusive storage regions matching the storage capacity specified for the storage channel are exclusively assigned to the storage channel in said receiving/storage apparatus,
   wherein said information transmitter transmits service configuration information describing at least storage capacity to be reserved in said receiving/storage apparatus, software necessary for use of storage channels, contract information concerning use of storage channels, encryption information for decoding information that is encrypted and transmitted, delivery schedule information for receiving information, entry information specifying the initial operation of selection of storage channels, or information for receiving such information, and wherein said receiving/storage apparatus reserves exclusive storage regions based on the storage capacity described in the service configuration information, manages the reserved regions in association with the storage channels as well as receives software, a contract key and an encryption key, and after said reception is successfully complete, starts information reception on the storage channel.

4. A store and forward broadcast service system comprising an information transmitter for transmitting information and receiving/storage apparatus for receiving and storing information,
   wherein said receiving/storage apparatus manages storage regions exclusively available to a specific storage channel and information transmitted as the storage channel is stored into the exclusive storage regions in said receiving/storage apparatus,
   wherein the capacity of the exclusive storage regions is specified per storage channel and that the exclusive storage regions matching the storage capacity specified for the storage channel are exclusively assigned to the storage channel in said receiving/storage apparatus, wherein at least storage channel identity and storage channel list information describing service configuration information per storage channel or information for receiving service configuration information is transmitted as list information of the storage channel under operation.

5. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association,
   wherein said storage channel management section comprises a storage channel control application section for managing storage channel list information as well as using said storage channel list information to generate a storage channel list screen,
   wherein information on individual storage channels is displayed on the storage channel list screen, the displayed information including at least one of an installation state and a subscription state.

6. Receiving/Storage apparatus according to claim 5, wherein the subscription state includes the states of non-subscription, subscription and subscription interruption.

7. Receiving/Storage apparatus according to claim 5, wherein storage channels can be selected using the same user interface as that for an ordinary broadcast service.

8. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association, wherein an installation screen is displayed in case an uninstalled storage channel is selected.

9. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association, wherein the subscription restart screen is displayed in case a storage channel in the subscription interruption state is selected.

10. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association, wherein, in case a storage channel in the subscription state is selected, presence/absence of the contract is checked and in case the contract check is successful, operation is made in accordance with the entry information, and in case the contract check fails, a message indicating the contract is invalid is displayed on the screen.

11. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association, wherein said receiving/storage apparatus further comprises a capacity management section and said capacity management section monitors the capacity of the exclusive storage regions on the storage channels.

12. Receiving/Storage apparatus wherein said apparatus has a storage channel management section for managing storage channels, a reservation processing section for making reservation processing to receive information on storage channels, a receiver for receiving information, and a storage management section for storing/managing the received information and managing the names used for referencing information and the names stored in the receiving/storage apparatus in association, wherein said receiving/storage apparatus further comprises a contract management section and, in case contract information is present in said service configuration information received by said receiver, said contract management section checks the validity of the contract.

13. An apparatus, comprising: a general-purpose computer having a receiving/storage program installed thereon, wherein said receiving/storage program makes the general-purpose computer to work as a storage channel management section for managing storage channels, a reservation processing section for making reservation processing to receive information on storage channels, a receiver for receiving information, and a storage management section for storing/managing the received information and managing names used for referencing information and names stored in the receiving/storage apparatus in association,
- wherein said receiving/storage program is used by a storage channel management section to work as a storage channel control application section for managing storage channel list information as well as using said storage channel list information to generate a storage channel list screen, and
- wherein information on individual storage channels is displayed on the storage channel list screen, the displayed information including at least one of an installation state and a subscription state.

14. An apparatus according to claim 13, wherein subscription state includes the states of non-subscription, subscription and subscription interruption.

15. An apparatus according to claim 13, wherein storage channels can be selected using the same user interface as that for an ordinary broadcast service.

16. An apparatus according to claim 13, wherein the installation screen is displayed in case an uninstalled storage channel is selected.

17. An apparatus according to claim 13, wherein the subscription restart screen is displayed in case a storage channel in the subscription interruption state is selected.

18. An apparatus according to claim 13, wherein, in case a storage channel in the subscription state is selected, presence/absence of the contract is checked and in case the contract check is successful, operation is made in accordance with the entry information, and in case the contract check fails, a message indicating the contract is invalid is displayed on the screen.

19. An apparatus according to claim 13, wherein said receiving/storage program further comprises a feature as a capacity management section for monitoring the capacity of the exclusive storage regions on the storage channels.

20. An apparatus according to claim 13, wherein said receiving/storage program further comprises a feature as a contract management section for checking the validity of the contract in case contract information is present in said service configuration information received by said receiver.

* * * * *